Jan. 12, 1965   C. O. WEISENBACH ETAL   3,164,960
HYDROSTATIC TRANSMISSION
Filed Sept. 3, 1963   2 Sheets-Sheet 2

INVENTORS
CHARLES O. WEISENBACH
SAMUEL G. WILLIAMS
BY *Dodge and Sons*
ATTORNEYS United States Patent Office 3,164,960
Patented Jan. 12, 1965

3,164,960
HYDROSTATIC TRANSMISSION
Charles O. Weisenbach, Watertown, and Samuel G. Williams, Cape Vincent, N.Y., assignors to The New York Air Brake Company, a corporation of New Jersey
Filed Sept. 3, 1963, Ser. No. 306,218
9 Claims. (Cl. 60—52)

This invention relates to hydrostatic transmissions, and particularly to improved controls for such transmissions.

A typical hydrostatic transmission includes a pump which is driven by a prime mover, such as an engine, a motor which is driven by the pump and which serves itself to drive the load being operated upon, and a pair of conduits which connect the pump and motor in a closed transmission circuit. Usually the pump is of the variable displacement type and incorporates an overcenter displacement control element, i.e., a displacement control element which is movable between maximum displacement positions on opposite sides of a zero displacement position to reverse the direction of flow through the closed circuit and thus to reverse the direction in which the load is driven. The transmission is provided with a manual actuator which permits the operator to vary pump displacement and change the direction of flow, and consequently, to vary motor speed and change the direction in which the load is driven, and an override device which responds to the operating pressure in the transmission circuit and reduces the pump displacement selected by the operator as pressure rises. The override device is intended to prevent the transmission from overloading the prime mover.

In some installations, for example transmissions used to drive the wheels of a front end loader, the transmission pump is driven by an engine which also drives an implement pump that supplies hydraulic fluid under pressure to an auxiliary work circuit. In these cases, the normal transmission override device is inadequate to prevent overloading and stalling of the vehicle engine because it does not take into account the load imposed by the implement pump.

One object of the present invention is to provide a hydrostatic transmission having controls which permit it to draw the maximum amount of power from the prime mover under all operating conditions without imposing an overload or stalling load on the prime mover. These requirements are satisfied by providing a pair of override devices, one of which responds to the operating pressure in the transmission circuit and the other of which responds to the load pressure in the work circuit, which act together to limit or reduce the displacement of the transmission pump selected by the operator. In this way, stalling of the engine is precluded without unduly limiting the power made available to the hydrostatic transmission.

Other objects of the invention are to provide an improved servo control circuit for positioning the displacement control element of the pump, and a novel remote actuation circuit for operating the servo control.

The preferred embodiment of the invention, and one modification thereof, are described herein with reference to the accompanying drawings in which.

FIG. 1 Embodiment

Figure 1:
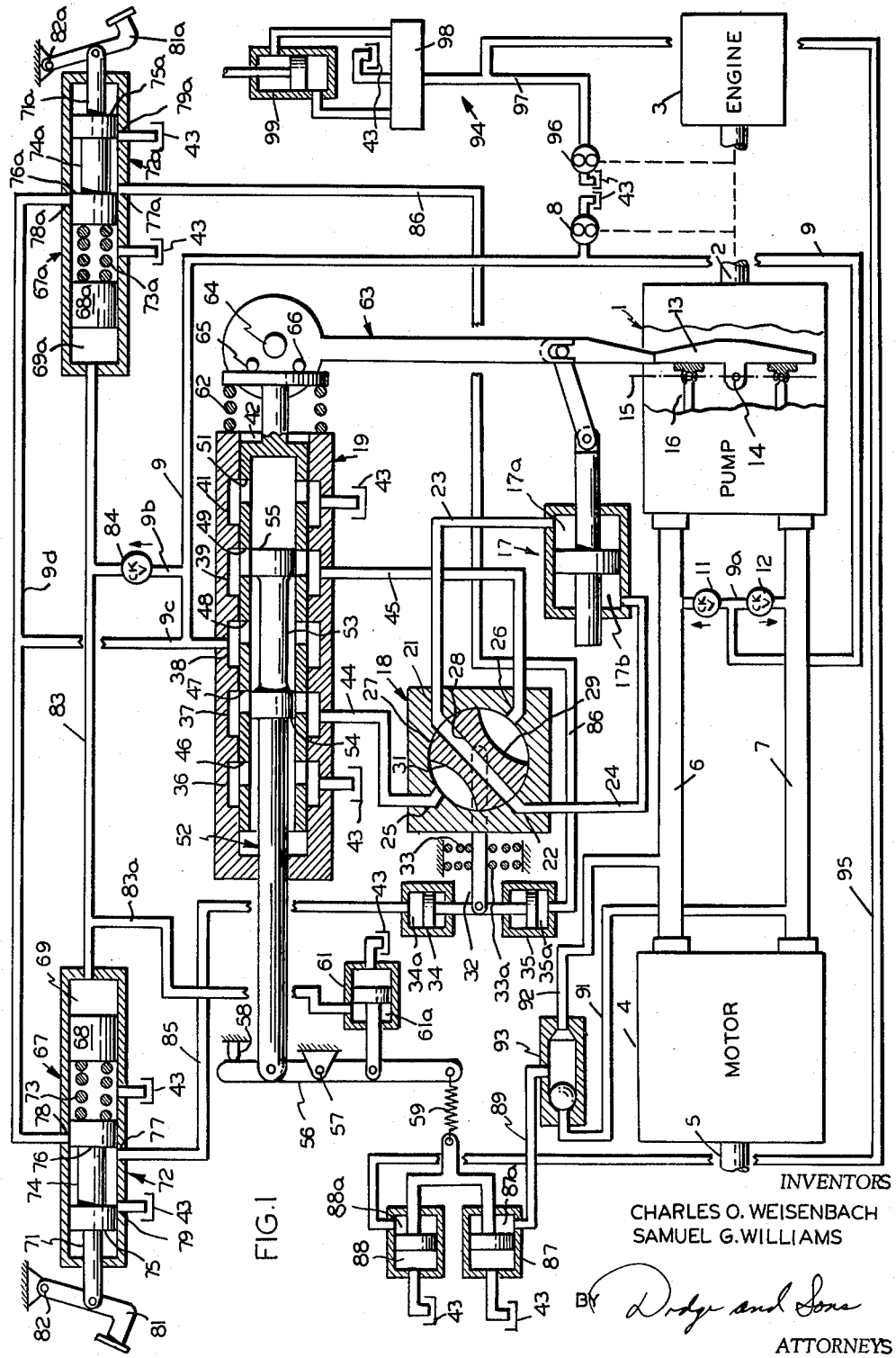
FIG. 1 is a schematic diagram of an improved hydrostatic transmission according to this invention suitable for use on a front end loader.

As shown in FIG. 1, the transmission comprises a variable displacement pump 1 having a drive shaft 2 which is connected in driven relation with the output shaft of an engine 3, a fixed displacement motor 4 whose drive shaft 5 is connected with the wheels (not shown) of the loader, and a pair of main conduits 6 and 7 which connect the pump and motor in a closed transmission circuit. Engine 3 also drives a charge pump 8 which delivers fluid to the main conduits 6 and 7 through conduit 9 and branched conduit 9a containing check valves 11 and 12, and thus serves to maintain the transmission circuit liquid-filled. In its complete form, the transmission includes a relief circuit (not shown) for limiting the pressure in the low and high pressure sides of the transmission circuit and for continuously withdrawing and cooling a portion of the liquid in that circuit. U.S. Patent 2,961,829, issued November 29, 1960, discloses a suitable relief circuit.

Pump 1 and motor 4 are of the rotary cylinder barrel, longitudinally reciprocating type, and the pump includes a cam plate 13 which is angularly adjustable about the axis of trunnion 14 between maximum displacement positions on opposite sides of the illustrated zero displacement position. The axis of trunnion 14 is normal to the axis of rotation of pump 1 and intersects that axis in the plane 15 containing the centers of the spherical heads of piston 16. As a result, the reaction forces exerted by the pistons 16 urge the cam plate 13 toward the zero displacement position whenever pump 1 is pumping. Cam plate 13 is shifted in opposite directions from the illustrated position by a double-acting, equal area piston motor 17 which is controlled by a directional control valve 18 and a speed control valve 19.

The directional control valve 18 comprises a housing containing a pair of motor passages 21 and 22 which are connected with the working chambers 17a and 17b of motor 17 by conduits 23 and 24, respectively, a pair of control passages 25 and 26, and a rotary valve element 27. The valve element 27 is provided with a cross passage 28 which, in the illustrated neutral position, interconnects motor passages 21 and 22, and a pair of arcuate cut-out portions 29 and 31. Counterclockwise rotation of the rotary valve element 27 causes it to assume a forward position in which arcuate portion 31 interconnects passages 22 and 25 and arcuate portion 29 interconnects passages 21 and 26, and clockwise rotation of the valve element causes it to assume a reverse position in which arcuate portion 31 interconnects passages 21 and 25 and arcuate portion 29 interconnects passages 22 and 26. The rotary valve element 27 is shifted between its three positions by an arm 32 to which it is attached, and is biased toward the illustrated neutral position by a pair of centering springs 33 and 33a. The rotary valve element 27 is shifted to its forward and reverse positions against the bias of its centering springs by a pair of opposed, single-acting piston motors 34 and 35, respectively.

Speed control valve 19 comprises a housing containing a valve bore which is intersected by five spaced, annular chambers 36, 37, 38, 39, and 41, and which contains a reciprocating valve sleeve 42. Annular chambers 36 and 41 are in continuous communication with a reservoir 43, annular chambers 37 and 39 are connected with control passages 25 and 26, respectively, of the directional control valve 18 by conduits 44 and 45, and annular chamber 38 is connected with charge pump 8 via conduit 9. Valve sleeve 42 is formed with five spaced sets of radial passages 46, 47, 48, 49 and 51, which register, respectively, with annular chambers 36, 37, 38, 39 and 41 and contains a reciprocable valve plunger 52 formed with an annular groove 53 and a pair of lands 54 and 55. These lands 54 and 55 are slightly wider than the radial passages 47 and 49, respectively, so that when valve plunger 52 is in the illustrated null position with respect to valve sleeve 42 the lands close the passages. At its left end, valve plunger 52 is attached to a lever 56 which is pivoted at 57 and biased toward the illustrated position in which its upper end abuts stop 58 by a tension spring 59. The stop 58 defines the neutral position of valve plunger 52 relative to the housing of speed control valve 19. Valve plunger 52 is shifted to the left from the illustrated neutral position against the bias of spring 59 by a piston motor 61. Valve sleeve 42 is biased to the right by coil compression spring 62 and is shifted to the left by a follow-up link 63 which is connected with cam plate 13 and pivoted at 64. The link 63 carries a pair of pins 65 and 66 which are located above and below, respectively, pivot 64, and which abut the enlarged right end of valve sleeve 42. When valve plunger 52 is in its neutral position with respect to the housing of valve 19 and cam plate 13 is in its zero displacement position, follow-up link 63 causes valve sleeve 42 to assume the illustrated null position with respect to the valve plunger. When cam plate 13 is moved away from its zero displacement position in either direction, valve sleeve 42 is shifted to the left against the bias of spring 62.

The valves 18 and 19 are operated hydraulically from a remote location by a pair of identical remote control actuators 67 and 67a. Actuator 67 comprises a housing containing a reciprocable piston 68, which constitutes the movable element of a fluid pressure motor having a working chamber 69, and a reciprocable valve plunger 71 of a selector valve 72. Piston 68 is biased to the right in the working chamber volume-decreasing direction by a coil compression spring 73 which reacts between this piston and the valve plunger 71. Valve plunger 71 is provided with an annular groove 74 and a pair of lands 75 and 76 which are arranged to control communication between the motor port 77 and the inlet and exhaust ports 78 and 79, respectively, of selector valve 72. The valve plunger 71 is actuated by a foot pedal 81 pivoted at 82.

Since the actuators 67 and 67a are identical, the parts of actuator 67a are identified by the same reference numerals used in connection with actuator 67 with the subscript a added for clarity. The working chambers 69 and 69a of the remote actuators are connected in a closed circuit with the working chamber 61a of motor 61 by conduits 83 and 83a, and this circuit is maintained liquid filled by charge pump 8 with which it is connected by conduit 9 and conduit 9b containing check valve 84. The inlet ports 78 and 78a of the two selector valves are connected with charge pump 8 via conduits 9, 9c and 9d and the exhaust ports 79 and 79a of these valves are in continuous communication with reservoir 43. The motor port 77 of selector valve 72 is connected with the working chamber 34a of motor 34 via conduit 85 and the motor port 77a of valve 72a is connected with the working chamber 35a of motor 35 via conduit 86. When the foot pedals 81 and 81a are in their illustrated inactive positions in which they rest against stops (not shown), the groove 74 or 74a of the associated selector valve plunger interconnects the motor and exhaust ports and thus vents the working chambers 34a and 35a of the motors 34 and 35. When either foot pedal is depressed, the associated valve land 75 or 75a closes the exhaust port of the associated selector valve and the groove 74 or 74a interconnects the inlet and motor ports.

The left end of biasing spring 59 is attached to the interconnected pistons of a pair of override motors 87 and 88. The working chamber 87a of override motor 87 is selectively connected with whichever of the main conduits 6 and 7 is the high pressure conduit by a circuit including conduits 89, 91 and 92 and shuttle valve 93. It is assumed that when the transmission is operating in the forward direction, main conduit 6 is the high pressure conduit, so, under this condition, shuttle valve 93 assumes the illustrated position in which it interconnects conduits 89 and 92. When the transmission is operating in reverse and main conduit 7 is the high pressure conduit, shuttle valve 93 shifts to the right and interconnects conduits 89 and 91. Override motor 88, on the other hand, responds to the load pressure in an implement circuit 94 with which its working chamber 88a is connected by conduit 95. This implement circuit includes a pump 96 which is driven by engine 3 and which is arranged to deliver fluid through conduit 97 to the inlet port of a four-way, open center, directional control valve 98. This valve is arranged to control flow to and from the opposite sides of a double-acting implement motor 99, such as the boom-lifting or bucket-tilting motor of the loader. The two override motors 87 and 88 act together to increase and decrease, respectively, the bias exerted by spring 59 as the operating pressure in the transmission circuit and the load pressure in the implement circuit rise and fall. As explained in more detail below, the effect of this arrangement is to limit or reduce the displacement of pump 1 selected by the operator through either of the remote actuators 67 and 67a.

*Operation of Fig. 1 Embodiment*

The parts of the transmission control circuit are so proportioned and designed that when the foot pedals 81 and 81a are in their illustrated inactive positions, the selector valves 72 and 72a vent motors 34 and 35 and centering springs 33 and 33a maintain the directional control valve 18 in its neutral position. At this time, spring 59 maintains speed control valve 19 in its illustrated neutral position. Thus, during idle conditions, the opposed working chambers 17a and 17b of motor 17 are interconnected so that this motor can float and allow the biasing forces developed by pump pistons 16 to maintain cam plate 13 in the zero displacement position.

In order to drive the loader in the forward direction, the operator depresses foot pedal 81 to thereby shift valve plunger 71 to the right and cause land 75 to close exhaust port 79 and also to cause plunger groove 74 to interconnect inlet and motor ports 78 and 77, respectively. Fluid under pressure is now transmitted from charge pump 8 to the working chamber 34a of motor 34 via conduits 9, 9c, 9d, inlet port 78, plunger groove 74, motor port 77 and conduit 85. As a result, motor 34 rotates valve element 27 in the counterclockwise direction to the forward position in which arcuate portion 31 interconnects passages 22 and 25 and arcuate portion 29 interconnects passages 21 and 26. The preload in spring 59 is so selected that during this initial movement of valve plunger 71, piston 68 is held in its illustrated position. If the operator continues to depress foot pedal 81, the shifting force transmitted to piston 68 through spring 73 causes the piston to move to the right and displace fluid from working chamber 69. This fluid is transferred, through conduit 83a, to the working chamber 61a of motor 61, and causes the last mentioned motor to pivot lever 56 in the counterclockwise direction about pivot 57 against the opposing bias exerted by spring 59. This movement of lever 56 shifts valve plunger 52 to the left and opens communication between radial passages 47 and 48 through plunger groove 53, and also opens communication between radial passages 49 and 51 across the right peripheral edge of valve land 55. Fluid under charge pump pressure, which is delivered to annular chamber 38 through conduit 9, may now flow to working chamber 17b of motor 17 via radial passages 48, plunger groove 53, radial passages 47, annular chamber 37, conduit 44, control passage 25, arcuate portion 31, motor passage 22 and conduit 24. Simultaneously, working chamber 17a is vented to reservoir 43 along an exhaust path including conduit 23, motor passage 21, arcuate portion 29, control passage 26, conduit 45, annular chamber 39, radial passages 49 and 51, and annular chamber 41. Motor 17, therefore, moves cam plate 13 in the clockwise direction about the axis of trunnion 14 and causes pump 1 to discharge fluid under pressure to main conduit 6. This fluid flows through motor 4 and is returned to pump 1 via main conduit 7, and causes the motor to commence to drive the wheels of the loader. The rate of flow through the transmission circuit, and consequently the speed of motor 4, are a function of the angular position of cam plate 13, and, therefore, as the cam plate moves away from the zero displacement position, vehicle speed increases. Movement of cam plate 13 in this direction causes follow-up link 63 and pin 65 to shift valve sleeve 42 to the left toward a null position with respect to valve plunger 52, so that these valve members will assume that position and interrupt flow to and from motor 17 when the position of cam plate 13 corresponds to the position of foot pedal 81. Since motor 17 is hydraulically locked whenever speed control valve 19 is in a null position, motor 17 holds cam plate 13 in its actuated position until either the operator again moves foot pedal 81 or one of the two override motors 87 and 88 shifts lever 56.

In order to reduce vehicle speed, the operator reduces the force exerted on foot pedal 81 so that spring 59 can move lever 56 in the clockwise direction about pivot 57 and displace fluid from working chamber 61a to working chamber 69 through conduits 83a and 83. As lever 56 moves, it shifts valve plunger 52 to the right from the null position with respect to valve sleeve 42 and opens a supply path from charge pump 8 to working chamber 17a comprising conduit 9, annular chamber 38, radial passages 48, plunger groove 53, radial passages 49, annular chamber 39, conduit 45, control passage 26, arcuate portions 29, motor passage 21 and conduit 23. Simultaneously, valve plunger 52 opens an exhaust path from working chamber 17b to reservoir 43 comprising conduit 24, motor passage 22, arcuate portion 31, control passage 25, conduit 44, annular chamber 37, radial passages 47 and 46, and annular chamber 36. Motor 17, in conjunction with the biasing forces exerted by pump pistons 16, now moves cam plate 13 in the counterclockwise direction about the axis of trunnion 14 to a reduced displacement position. During this movement of the cam plate 13 follow-up link 63 permits spring 62 to move valve sleeve 42 to the right and follow the movement of valve plunger 52. When the position of cam plate 13 corresponds to the new, reduced-speed position of foot pedal 81, valve sleeve 42 will be in a null position with respect to valve plunger 52 and motor 17 and again be hydraulically locked. Should the operator release foot pedal 81, spring 59 will move valve plunger 52 to its neutral position, the servo control will return cam plate 13 to its zero displacement position, selector valve 72 will again vent working chamber 34a, and centering springs 33 and 33a will return directional control valve 18 to its neutral position.

When the transmission is driving the loader in the forward direction, main conduit 6 is the high pressure conduit and shuttle valve 93 shifts to the illustrated position and connects this main conduit with the working chamber 87a of override motor 87. This override motor increases the load in spring 59 and tends to cause lever 56 to rotate in the clockwise direction about pivot 57 as the operating pressure in the transmission circuit rises. However, in order for lever 56 to move in this direction, fluid must be displaced from working chamber 61a and transferred to working chamber 69. Under normal conditions, the force exerted on piston 68 by spring 73 is sufficient to prevent it from moving in the working chamber volume-increasing direction, and, therefore, transfer of liquid from working chamber 61a to working chamber 69, and consequently movement of lever 56, is prevented. However, during abnormal loading conditions which occur, for example, when the loader encounters a steep grade, override motor 87 does rotate lever 56 in the clockwise direction and fluid is transferred from working chamber 61a to working chamber 69. This movement of lever 56 shifts valve plunger 52 to the right from the null position relative to valve sleeve 42 and causes plunger groove 53 to interconnect radial passages 48 and 49, and thus open a supply path to working chamber 17a, and also causes land 54 to uncover radial passages 47 and thus open an exhaust path from working chamber 17b. As a result, motor 17 commences to move cam plate 13 toward its zero displacement position. Since follow-up link 63 allows spring 62 to shift valve sleeve 42 to the right toward a null position relative to valve plunger 52 as cam plate 13 moves in the displacement-reducing direction, the reduction in the displacement of pump 1 effected by override motor 87 is a function of how far this motor shifts lever 56 in the clockwise direction, and the magnitude of this movement, in turn, depends upon the severity of the overload condition and upon the preload in and rate of spring 73. This spring 73 is so designed that the maximum power demand of the transmission is always safely below the stalling load of engine 3. When cam plate 13 reaches the reduced displacement position required by the prevailing load pressure in main conduit 6, valve sleeve 42 and valve plunger 52 will again be in a null position with respect to each other and motor 17 will be hydraulically locked. Upon termination of the overload condition, the force developed by override motor 87 decreases and spring 73 shifts piston 68 to the right and effects a transfer of liquid from working chamber 69 to working chamber 61a. Motor 61 now moves lever 56 in the counterclockwise direction and the control circuit returns cam plate 13 to the position called for by foot pedal 81.

In the preceding discussion, it was assumed that the overload condition arose at a time when cam plate 13 was in the position selected by the operator, and thus the override motor 87 performed a displacement-reducing function. It should be noted that this motor also can perform a displacement-limiting function in those cases where the operator is changing pump displacement at a time when the transmission is under a substantial load. Under these conditions, override motor 87 limits the distance piston 68 can be moved to the right by valve plunger 71 and thereby limits the quantity of liquid transferred from working chamber 69 to working chamber 61a. Thus, the controls move cam plate 13 in the displacement-increasing direction only to that position permitted by the prevailing operating pressure in main conduit 6. When the overload condition terminates, motor 87 allows spring 73 to expand and cause piston 68 to transfer to working chamber 61a the additional liquid required to enable motor 61 and the servo control circuit to move cam plate 13 to the position called for by foot pedal 81.

Override motor 88, which responds to the load pressure in the implement circuit 94, acts on lever 56 through spring 59 in the same sense as override motor 87. Therefore, the limiting displacement of pump 1 is a function of the load imposed on the implement circuit as well as the load imposed on the transmission circuit. During "crowding" operations, when the load on the implement circuit is high, the maximum permissible pressure in main conduit 6 is relatively low and consequently the speed of the loader is limited to a rather low value. On the other hand, when the implement circuit is idle, such as it normally is when the loader is traveling along a road, a relatively high pressure can be tolerated in the closed transmission circuit without overloading engine 3. Consequently, under these conditions, the maximum vehicle speed is high.

In order to drive the loader in the reverse direction, the operator depresses foot pedal 81a. As in the case of actuator 67, initial movement of foot pedal 81a opens selector valve 72a and causes fluid under charge pump pressure to be transmitted to working chamber 35a of motor 35 via conduits 9, 9c and 9d, inlet port 78a, plunger groove 74a, motor port 77a, and conduit 86. At this time, working chamber 34a of motor 34 is vented to reservoir 43 through conduit 85 and motor port 77, plunger groove 74 and exhaust port 79 of selector valve 72. Motor 35 now rotates valve element 27 in the clockwise direction against the centering bias of spring 33 to a reverse position in which arcuate portion 31 interconnects passages 21 and 25, and arcuate portion 29 interconnects passages 22 and 26. Continued movement of the foot pedal 81a shifts piston 68a to the left and causes it to displace fluid from working chamber 69a to working chamber 61a through conduits 83 and 83a. Motor 61 now rotates lever 56 in the counterclockwise direction, thereby causing valve plunger 52 to move to the left from the null position relative to valve sleeve 42. This movement of the valve plunger opens a supply path from charge pump 8 to working chamber 17a and also opens an exhaust path from working chamber 17b to reservoir 43. As a result, motor 17 moves cam plate 13 in the counterclockwise direction about the axis of trunnion 14. As the cam plate moves in this direction, the pin 66 on follow-up link 63 shifts valve sleeve 42 to the left and re-establishes the null position when the cam plate has reached a position corresponding to the actuated position of foot pedal 81a. As in the case of operation in the forward direction, valve sleeve 42 and valve plunger 52 assume a null position and hydraulically lock motor 17 when this correspondence is established. The override motors 87 and 88 act on speed control valve 19 through lever 56 in the same way during reverse operation as they do during forward operation, and therefore, further description of the operation of these devices is deemed unnecessary. When the operator releases foot pedal 81a, spring 59 rotates lever 56 in the clockwise direction about pivot 57 and causes fluid to be transferred from working chamber 61a to working chamber 69a. Clockwise movement of lever 56 shifts valve plunger 52 to the right from the null position with respect to valve sleeve 42 and opens a supply path to working chamber 17b and an exhaust path from working chamber 17a. Motor 17 therefore commences to move cam plate 13 back to the zero displacement position. When foot pedal 81a has been returned to the illustrated position, cam plate 13 will have been moved to its zero displacement position and, since plunger groove 74a now reconnects motor port 77a and exhaust port 79a, centering springs 33 and 33a will return directional control valve 18 to its neutral position.

In the embodiment of FIG. 1, which employs a directional control valve 18 having a neutral position that permits floating of motor 17, creeping of the transmission is avoided when the actuator pedals 81 and 81a are in their inactive positions because the biasing forces exerted by pump piston 16 are able to return cam plate 13 to the zero displacement position. Thus, should valve sleeve 42 of speed control valve 19 fail to assume precisely the null position with respect to valve plunger 52, motor 17 will not be actuated. On the other hand, since the cam plate 13 is free to float when the foot pedals are in their inactive positions, and since the biasing forces exerted by the pump pistons 16 will urge the cam plate toward its maximum displacement position whenever the pump 1 is driven as a motor, this circuit does not afford hydrodynamic braking during overrunning conditions at motor 4. In systems where hydrodynamic braking is of primary importance, the embodiment of FIG. 2 may be used.

FIG. 2 Embodiment

Figure 2:
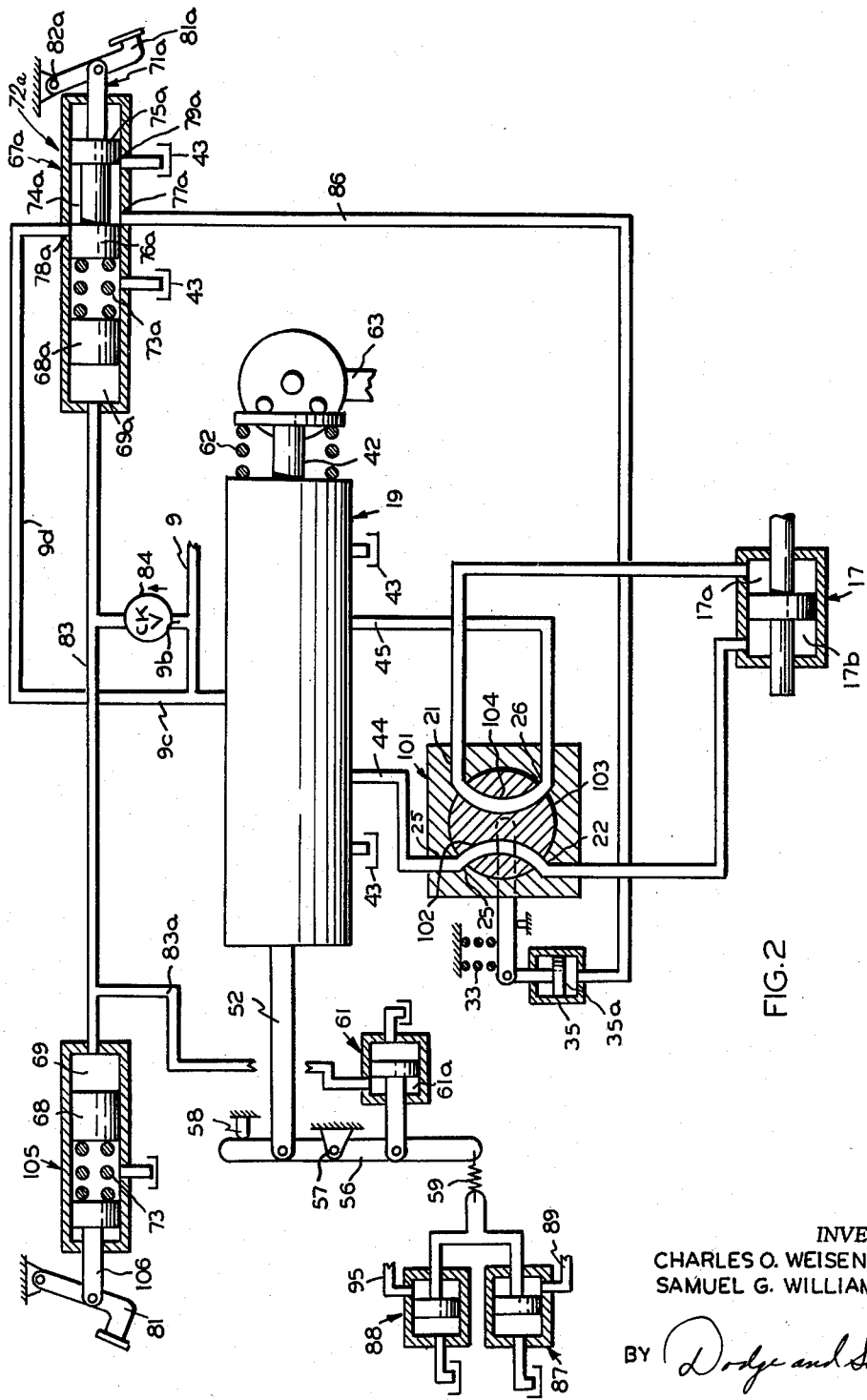
FIG. 2 is a partial schematic diagram illustrating a modification of the directional control valve and the remote actuation circuit employed in FIG. 1.

In the FIG. 2 embodiment, the directional control valve 101 is a two-position valve having a forward position (which is illustrated) in which a passage 102 formed in rotary valve element 103 interconnects control passage 25 and motor passage 22 and passage 104 interconnects motor passage 21 and control passage 26, and a reverse position in which passage 102 interconnects passages 21 and 25 and passage 104 interconnects passages 22 and 26. The valve element 103 is biased toward the illustrated position by spring 33 and is moved to the second position by piston motor 35.

Since the directional control valve in the second form of the invention is biased to its forward position the remote actuator 105 employed for effecting forward operation need not include a selector valve such as the valve 72 incorporated in remote actuator 67 of FIG. 1. Therefore, as shown in FIG. 2, the remote actuator 105 includes merely the piston 68, the spring 73, and a plunger 106 which is operated by foot pedal 81 and on which the left end of spring 73 is seated. The working chamber 69 of this actuator is, as in the previous embodiment, connected in a closed circuit with the working chamber 69a of the reverse actuator 67a and with the working chamber 61a of motor 61.

In the FIG. 2 embodiment, depression of foot pedal 81 displaces fluid from working chamber 69 to working chamber 61a, thereby causing motor 61 to shift valve plunger 52 of speed control valve 19 to the left. Since directional control valve 101 is already in its forward position, movement of the valve plunger 52 automatically effects venting and pressurizing of the working chambers 17a and 17b, respectively, of motor 17. As in the previous case, the movable members of speed control valve 19 will be returned to a null position when the cam plate 13 reaches a position corresponding to the actuated position of foot pedal 81. When the foot pedal 81 is released, spring 59 will shift lever 56 back to its illustrated position thereby effecting a transfer of liquid from working chamber 61a to working chamber 69, and causing the servo control to return cam plate 13 to the zero displacement position.

When reverse pedal 81a is depressed, shuttle valve 72a interrupts the exhaust path leading from working chamber 35a to reservoir 43 and then connects working chamber 35a with the charge pump conduit 9. As the pressure builds up in this working chamber motor 35 shifts rotary valve element 103 to its reverse position against the bias of spring 33. As movement of pedal 81a continues, fluid is transferred from working chamber 69a to working chamber 61a and the pump controls function in the manner previously described to move cam plate 13 to a position corresponding to the position of pedal 81a. When pedal 81a is released, cam plate 13 is returned to its zero displacement position, and selector valve 72a again vents working chamber 35a. At this time, spring 33 moves the rotary valve element 103 back to its forward position.

Inasmuch as the directional control valve 101 does not permit floating of motor 17 when the foot pedals are in their inactive positions, the biasing forces exerted on cam plate 13 by the pump pistons are ineffective to move the cam plate in either direction. Therefore, during overrun conditions, the cam plate 13 does not move toward an increased displacement position in order to enable pump 1 to accept the fluid being discharged by motor 4. As a result, this transmission does afford hydrodynamic braking. It will be noted that since the opposed working chambers of motor 17 are not isolated from the speed control valve 19 when the pedals 81 and 81a are in their inactive positions, it is imperative that speed control valve 19 permit no flow of fluid under pressure to either conduit 44 or conduit 45 when valve sleeve 42 and valve plunger 52 are in a null position if creeping of the loader is to be avoided.

As stated previously, the drawings and description relate only to the preferred and one modified form of the invention. Since changes can be made in the structures of these embodiments without departing from the inventive concept the following claims should provide the sole measure of the scope of the invention.

What we claim is:
1. In combination
   (a) a prime mover;
   (b) a pair of work-performing devices;
   (c) a hydrostatic transmission including a variable displacement pump connected with the prime mover and a motor connected with one work-performing device for transmitting power from the prime mover to that work-performing device;

(d) a second pump connected with the prime mover;

(e) a fluid pressure motor connected with the other work-performing device;

(f) a circuit for delivering fluid under pressure from the second pump to the fluid pressure motor;

(g) manually operable means for varying the displacement of the variable displacement pump; and (h) a pair of override means arranged to limit the displacement-increasing effectiveness of the manually operable means, one means being responsive to the load pressure in the hydrostatic transmission and the other means being responsive to the load pressure in the circuit.

2. A hydrostatic transmission comprising (a) a reversible motor;

(b) a variable displacement pump having a displacement control element movable between maximum displacement positions on opposite sides of a zero displacement position to vary the output of and the direction of flow through the pump;

(c) conduit means connecting the pump and motor in a closed transmission circuit;

(d) a reservoir and a source of fluid under pressure;

(e) first and second opposed fluid pressure motors connected with the displacement control element for moving it in opposite directions from the zero displacement position;

(f) a directional control valve connected with the first and second fluid pressure motors and including first and second control passages and a movable valve member, the movable valve member having a forward position in which the first and second control passages are connected with the first and second motors, respectively, and a reverse position in which the first and second control passages are connected with the second and first motors, respectively;

(g) first manually operable means connected with the movable member of the directional control valve for shifting it between said forward and reverse positions;

(h) a speed control valve connected with the source, the reservoir and the two control passages and including a housing containing first and second coacting movable valve members having a null position in which the control passages are isolated from each other and from both the source and the reservoir, relative movement of the valve members in one direction from the null position serving to connect the first and second control passages with the source and the reservoir, respectively, and relative movement of the valve members in the opposite direction from the null position serving to connect the first and second control passages with the reservoir and source, respectively;

(i) second manually operable means connected with the first valve member of the speed control valve for shifting it in said opposite relative direction from a neutral position relative to the housing and for returning it to said neutral position;

(j) follow-up means connecting the second valve member of the speed control valve with the displacement control element for moving said member in said one and said opposite relative directions as the displacement control element moves away from and toward the zero displacement position, respectively, said follow-up means being arranged to place the second valve member in said null position relative to the first valve member when the first valve member is in said neutral position and the displacement control element is in the zero displacement position; and (k) override means responsive to the operating pressure in the closed transmission circuit for overriding the second manually operable means and shifting the first movable member of the speed control valve in said one relative direction as the pressure rises.

3. A hydrostatic transmission as defined in claim 2

(a) in which the first manually operable means comprises (1) first spring means biasing the movable member of the directional control valve toward one of its forward and reverse positions, (2) a third fluid pressure motor for shifting the movable member of the directional control valve toward the other of its forward and reverse positions against the bias of the first spring means, (3) a selector valve connected with the source, the reservoir and the third fluid pressure motor and having supply and vent positions in which, respectively, it connects the third motor with the reservoir and the source, and (4) a first manual actuator for shifting the selector valve from the vent to the supply position; and (b) in which the second manually operable means comprises (1) stop means limiting movement of the first member of the speed control valve in said one relative direction to thereby define said neutral position, (2) second spring means biasing the first member of the speed control valve toward said neutral position, (3) a fourth fluid pressure motor having a working chamber and arranged to shift the first member of the speed control valve in said opposite relative direction, (4) a fifth fluid pressure motor having a working chamber and a movable element shiftable in chamber volume-decreasing and volume-increasing directions, (5) a sixth fluid pressure motor having a working chamber and a movable element shiftable in chamber volume-decreasing and volume-increasing directions, (6) a closed, liquid-filled circuit interconnecting the working chambers of the fourth, fifth and sixth fluid pressure motors, (7) third spring means including a movable seat and a spring reacting between the seat and the movable element of the fifth motor and urging that element in the chamber volume-decreasing direction, (8) fourth spring means including a seat and a spring reacting between the seat and the movable element of the sixth motor and urging that element in the chamber volume-decreasing direction, the seat being connected with the first manual actuator so that the actuator moves it in the spring load-increasing direction as it moves the selector valve away from its vent position, and (9) a second manual actuator connected with the seat of the third spring means for moving it in the spring load-increasing direction.

4. A hydrostatic transmission as defined in claim 2

(a) in which the movable member of the directional control valve has an intermediate neutral position in which it interconnects the first and second fluid pressure motors;

(b) in which the first manually operable means comprises (1) centering means biasing the movable member of the directional control valve to its neutral position, (2) third and fourth opposed fluid pressure motors arranged to shift the movable member of the directional control valve in opposite directions from its neutral position, (3) first and second selector valves, one being connected with the source, the reservoir and the third motor and having vent and supply positions in which, respectively, it connects the third motor with the reservoir and the source, and the other selector valve being connected with the source, the reservoir and the fourth motor, and having vent and supply positions in which, respectively, it connects the fourth motor with the reservoir and the source, and (4) first and second manual actuators for shifting the first and second selector valves, respectively, from their vent to their supply positions; and (c) in which the second manually operable means comprises (1) stop means limiting movement of the first member of the speed control valve in said one relative direction to thereby define said neutral postion, (2) first spring means biasing the first member of the speed control valve toward said neutral postion, (3) a fifth fluid pressure motor having a working chamber and a movable element connected with the first member of the speed control valve for moving it in said opposite relative direction, (4) sixth and seventh fluid pressure motors, each having a working chamber and a movable element shiftable in chamber volume-decreasing and volume-increasing directions, (5) a closed, liquid-filled circuit interconnecting the working chambers of the fifth and sixth and seventh motors, (6) second spring means including a seat and a spring reacting between the seat and the movable element of the sixth motor and biasing that element in the chamber volume-decreasing direction, the seat being movable in the spring load-increasing direction by the first manual actuator as the latter moves the first selector valve away from its vent position, and (7) third spring means including a seat and a spring reacting between the seat and the movable element of the seventh motor and biasing that element in the chamber volume-decreasing direction, the seat being movable in the spring load-increasing direction by the second manual actuator as the latter shifts the second selector valve away from its vent position.

5. A hydrostatic transmission as defined in claim 3
 (a) in which the second spring means includes a seat movable in spring load-increasing and spring load-decreasing directions; and
 (b) in which the override means includes a fluid pressure override motor arranged to move the seat of the second spring means in the spring load-increasing direction.

6. A hydrostatic transmission as defined in claim 4
 (a) in which the first spring means includes a seat movable in spring load-increasing and spring load-decreasing directions; and
 (b) in which the override means includes a fluid pressure override motor arranged to move the seat of the first spring means in the spring load-increasing direction.

7. A hydrostatic transmission as defined in claim 2 in which the pump is driven by an engine which also drives a second pump that supplies fluid under pressure to a work circuit, and which includes second override means responsive to the operating pressure in the work circuit for overriding the second manually operable means and shifting the first movable member of the speed control valve in said one relative direction as the pressure rises.

8. A hydrostatic transmission as defined in claim 5 in which the pump is driven by an engine which also drives a second pump that supplies fluid under pressure to a work circuit, and which includes a second override motor that responds to the operating pressure in the work circuit and also shifts the seat of the second spring means in the spring load-increasing direction.

9. A hydrostatic transmission as defined in claim 6 in which the pump is driven by an engine which also drives a second pump that supplies fluid under pressure to a work circuit, and which includes a second override motor that responds to the operating pressure in the work circuit and also shifts the seat of the first spring means in the spring load-increasing direction.

No references cited.